(12) United States Patent
Vittrup

(10) Patent No.: US 11,533,922 B2
(45) Date of Patent: Dec. 27, 2022

(54) SHRIMP PEELING MACHINE

(71) Applicant: Seapeeler ApS, Saeby (DK)

(72) Inventor: Thomas Vittrup, Saeby (DK)

(73) Assignee: SEAPEELER APS, Saeby (DK)

( * ) Notice: Subject to any disclaimer, the term of this patent is extended or adjusted under 35 U.S.C. 154(b) by 0 days.

(21) Appl. No.: 17/272,758

(22) PCT Filed: Sep. 3, 2019

(86) PCT No.: PCT/EP2019/073469
§ 371 (c)(1),
(2) Date: Mar. 2, 2021

(87) PCT Pub. No.: WO2020/048984
PCT Pub. Date: Mar. 12, 2020

(65) Prior Publication Data
US 2021/0315220 A1    Oct. 14, 2021

(30) Foreign Application Priority Data

Sep. 4, 2018   (DK) .............................. PA201870570

(51) Int. Cl.
*A22C 29/00*    (2006.01)
*A22C 29/02*    (2006.01)

(52) U.S. Cl.
CPC .......... *A22C 29/021* (2013.01); *A22C 29/023* (2013.01); *A22C 29/028* (2013.01); *A22C 29/026* (2013.01)

(58) Field of Classification Search
CPC ... A22C 29/021; A22C 29/023; A22C 29/028; A22C 29/026
USPC ........................................................ 452/2
See application file for complete search history.

(56) References Cited

U.S. PATENT DOCUMENTS

| | | | | |
|---|---|---|---|---|
| 3,952,371 A | * | 4/1976 | LaPine | A22C 29/02 452/173 |
| 5,184,973 A | * | 2/1993 | Orlando | A22C 25/17 452/125 |
| 5,197,916 A | * | 3/1993 | Orlando | A22C 25/17 452/179 |
| 5,503,593 A | * | 4/1996 | Schill | A22C 17/12 452/130 |
| 8,777,701 B2 | | 7/2014 | Vittrup | |

FOREIGN PATENT DOCUMENTS

| | | |
|---|---|---|
| FR | 2 192 771 A1 | 2/1974 |
| GB | 812 851 A | 5/1959 |
| WO | 93/13673 A1 | 7/1993 |
| WO | 2016/177377 A1 | 11/2016 |

OTHER PUBLICATIONS

International Search Report issued for the corresponding international application No. PCT/EP2019/073469, dated Nov. 7, 2019, 2 pages.

\* cited by examiner

*Primary Examiner* — Richard T Price, Jr.
(74) *Attorney, Agent, or Firm* — Snyder, Clark, Lesch & Chung, LLP

(57) ABSTRACT

A machine for pre-treatment of selected shrimp types that are to be forwarded to machine peeling, which machine, across a conveyor belt with shrimps and at a height above this, comprises one or more mounted rotating brush that is driven by a motor and which in interaction with the distance to the conveyor belt separates the heads of the shrimps from the body.

12 Claims, 5 Drawing Sheets

SHRIMP PEELING MACHINE

TECHNICAL FIELD

The invention relates to a machine for pre-treatment of selected shrimp types that are to be forwarded to machine peeling.

BACKGROUND ART

From i.e. WO patent application no. 2016/177377 and U.S. Pat. No. 8,777,701 B2, shrimp peeling machines for peeling of shrimps are known.

However, it has turned out that there are some disadvantages of using these prior art shrimp peeling machines. As the shrimps that are caught, boiled and frozen at sea immediately after they have been caught have proven to have the disadvantage that, i.e. due to the use of large amounts of salt during boiling, the shrimp shell adheres more closely to the shrimp, for which reason, it is problematic to peel these shrimps using known machines when the catch comes ashore. This factor has meant that it has been necessary to peel the shrimps manually when they come ashore, and therefore they have often been transported around the world to be peeled manually in the cheapest location, for instance in Morocco.

However, experience has shown that if the heads of these shrimps are separated from the bodies at the beginning of the peeling process, it will be possible also to machine-peel these shrimps with a satisfactory result.

Accordingly, the main object of the invention is therefore to provide a machine that can remove the heads of the shrimps before they are forwarded to machine peeling, which machine must obviously also be able to fit in at an early stage of the shelling process.

SUMMARY OF THE INVENTION

The present invention relates to a machine of the type specified in the preamble of claim 1, which is characteristic in that the machine, across a conveyor belt with shrimps and at a height above this, comprises one or more mounted rotating brushes driven by a motor.

Hence, the machine, across a conveyor belt where the scrimps are to be positioned and at a height above the conveyor belt, comprises a rotating brush driven by a motor, or one or more mounted rotating brushes driven by a motor. The one or more mounted rotating brushes positioned across the conveyor belt are positioned at a predefined height above the surface of the conveyor belt. The height can be set to any predefined height depending on the kind of shrimps that are to be pre-treated by the machine. E.g. is it krill, which are a very small type, then the height from the conveyor belt to the one or more mounted rotating brushes are minor whereas if e.g. argentine red shrimp (*pleoticus muelleri*) are used, which are a larger type, then the height from the conveyor belt to the one or more mounted rotating brushes are larger.

By "shrimp" is meant al kinds of shrimps, krills and prawns.

In the present context the "selected shrimp types" can mean both raw and pre-boiled shrimps, which can be both small and larger in size.

By the "height" is meant the distance from the surface of the conveyor belt to the outermost point of the filaments/surface of the one or more mounted rotating brushes. This distance is participative in separating the heads of the shrimps from the body, and ripping of the shell, since the shrimps are caught in the gap between the surface of the conveyer belt and the filaments or outer periphery of the one or more mounted rotating brushes.

By "across" is meant that the one or more mounted rotating brushes span the width of the conveyer belt. It may span the width completely or it may span the width in e.g. at least 50% of the width of the conveyer belt. For a better understanding of "across" in the present invention, please see the figures.

When the shrimps are positioned on the conveyer belt the interaction with the one or more mounted rotating brushes separate the heads of the shrimps from the body, and the shell is simultaneously ripped up at least partly, so that the following treatment by a shrimp peeling machine itself can more easily and efficiently take place with improved quality of the peeled shrimps.

In this manner, the now headless shrimps are allowed to continue on the conveyer belt or onto a another conveyor belt and after a (possibly intelligent) specific gravity separation of heads and other shell parts, can be forwarded for machine peeling on for instance the known shrimp peeling machines mentioned above, whereby a manual handling, adding to the costs and possibly also a long transport to a location with cheap labour, can be avoided.

Due to the pre-treatment conducted by the pre-treatment machine of the present invention, the peeling machine can work much more efficiently and gentle which entails a higher output of high quality peeled shrimps.

The pre-peeling machine as disclosed herein can be used to pre-treat pre-boiled shrimps. Many shrimps that are caught, are boiled and frozen at sea immediately after they have been caught which have proven to have the disadvantage that, i.e. due to the use of large amounts of salt during boiling, the shrimp shell adheres more closely to the shrimp, for which reason, it is problematic to peel these shrimps using known machines when the catch comes ashore. Hence, the presently disclosed pre-peeling machine ease this step of peeling the scrimps due to that they have been pre-treated by the pre-treatment machine. This entails that the necessity to peel the shrimps manually when they come ashore can now be avoided. Further, the time and cost spend for transporting the scrimps around the world to be peeled manually in the cheapest location, for instance in Morocco, can also be avoided.

The pre-peeling machine as disclosed herein can also be used to pre-treat raw shrimps. This gives the advantage that less amount (kilograms) need to be boiled which reduces the energy consumption, since now both heads and shell have been removed from the rest of the scrimps so now you only boil the body part of the shrimps. The boiling of the shrimps at sea immediately after they have been caught is a bottle neck in the production line, so by the present invention can also be solved this issue by pre-treating the shrimps at sea before boiling them. Approximately, between 20-35% of the energy can be saved by boiling only the body part of the shrimps.

The present invention also relates to a process for pre-treatment of selected shrimp types, the process comprising the following steps:

- at one end of a conveyor belt, the shrimps to be pre-treated are loaded onto the conveyor belt;
- one or more mounted rotating brush (6) positioned across the conveyor belt (2) catch the shrimps and rip of the head of the shrimps and loosens the shell at least partly.

Other suitable embodiments for the method are specified in the claims, which state some setting options for rotation of the brush and setting of the distance between the brush and the conveyor belt, whereby it will be possible to adjust these parameters optimally.

BRIEF DESCRIPTION OF THE DRAWINGS

The invention will be explained further in the following with reference to the drawing, in which:

FIG. 1 shows this arrangement viewed in perspective of a first prototype, while FIG. 2 shows the same viewed directly from above, while FIGS. 3 and 4 show the arrangement viewed longitudinally from one end and moreover from one side, respectively of the first prototype, while FIG. 5 shows a diagram of the first prototype arrangement, while FIG. 6 shows an embodiment of a second prototype, while FIG. 7 shows a close up of one rotating brush and a plate, while

DETAILED DESCRIPTION

When describing the below embodiments, the present invention envisages all possible combinations and permutations of the below described embodiments with the above disclosed aspects.

As mentioned, the present invention relates to a pre-treatment machine, where, across a conveyor belt where the scrimps are to be positioned and at a height above the conveyer belt, the machine comprises one or more mounted rotating brushes driven by a motor.

Figure 1:
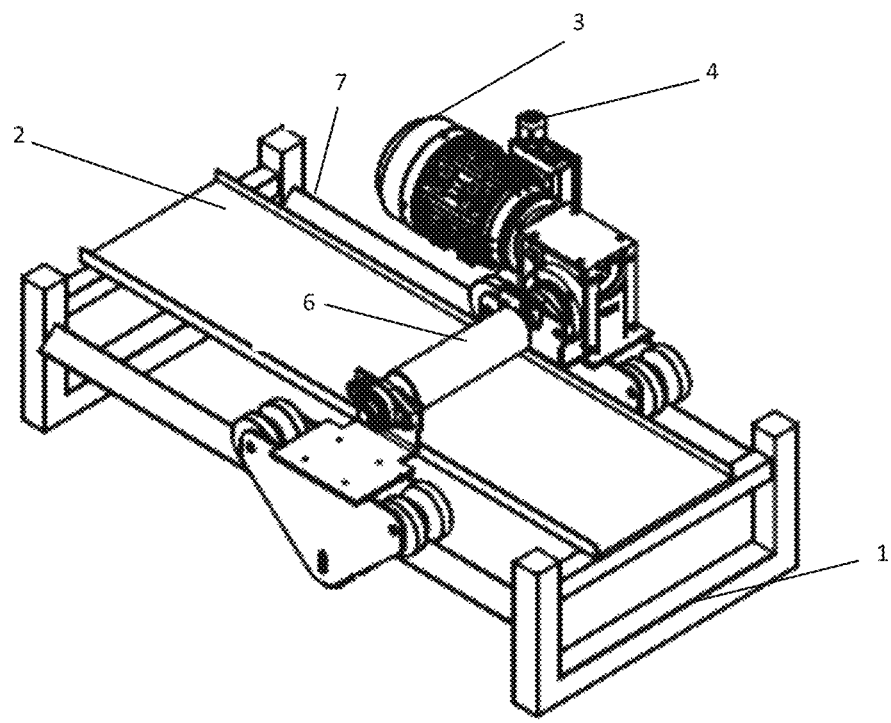
Figure 2:
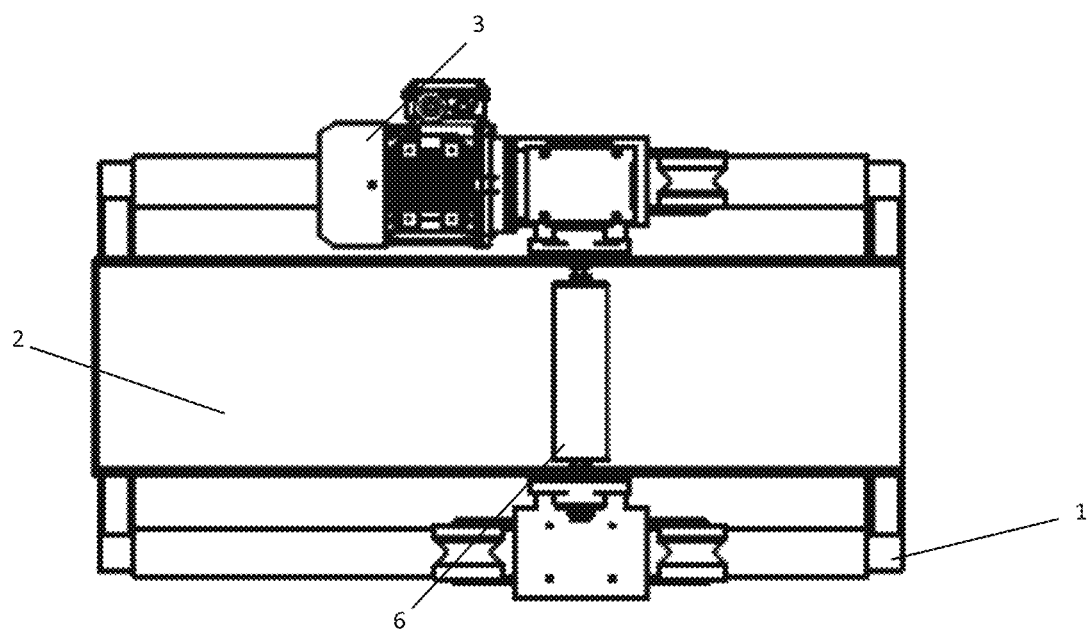
Figure 5:
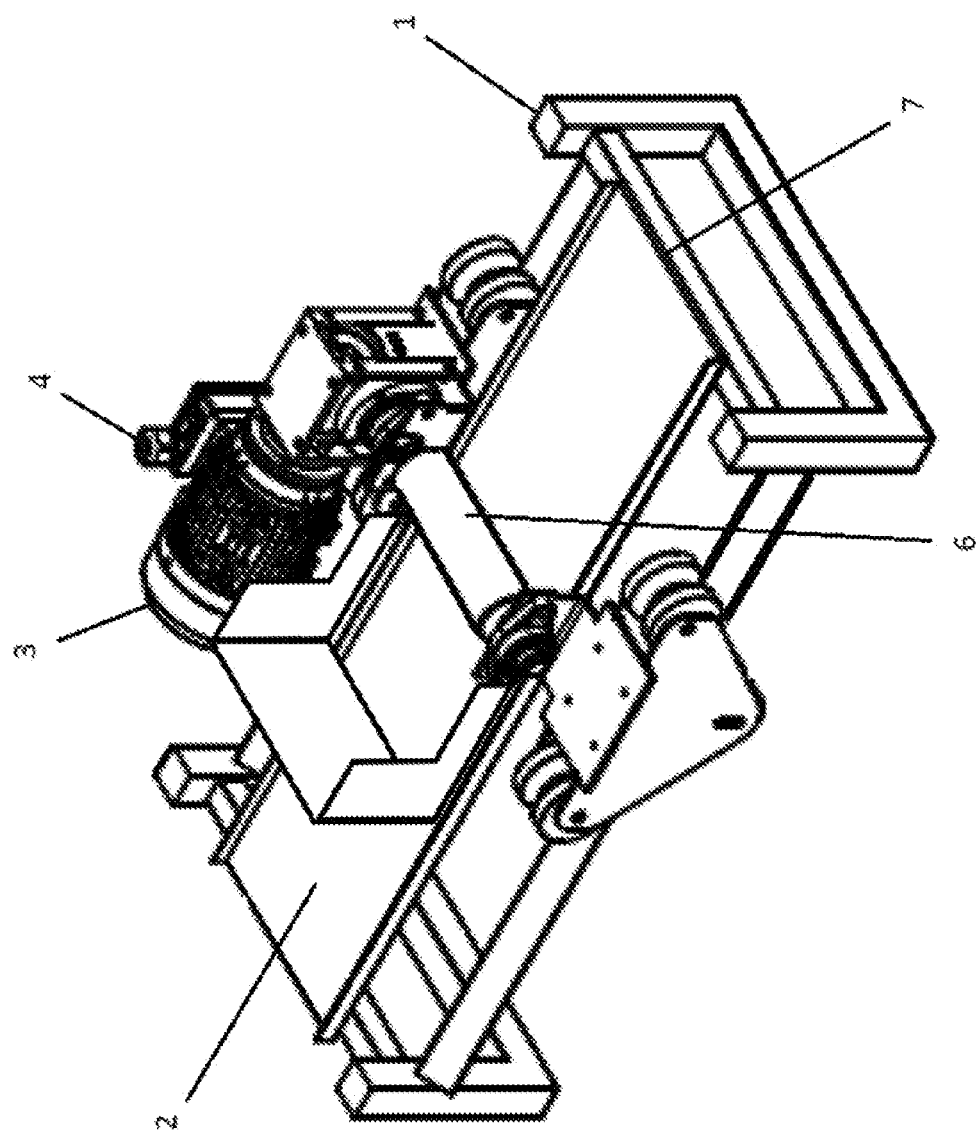

FIGS. 1, 2 and 5 show an arrangement of a prototype of the invention, where on a belt conveyor frame (1), a belt tray (7) is shown, wherein (part of) a conveyor belt (2) lies, above which a rotating brush (6) is shown, which is driven by a motor (3). These parts, "the belt" and the rotating brush (6) can be moved horizontally relative to each other to simulate a movement of the "conveyor belt" (2) with shrimps towards the brush (6), where these, the shrimps, subject to the action of the brush (6) rotation in interaction with the distance between the brush (6) and the "conveyor belt" (2), have the heads separated from the body while the shell is simultaneously ripped up, so that the shrimp peeling machine itself can more easily take hold.

Figure 3:
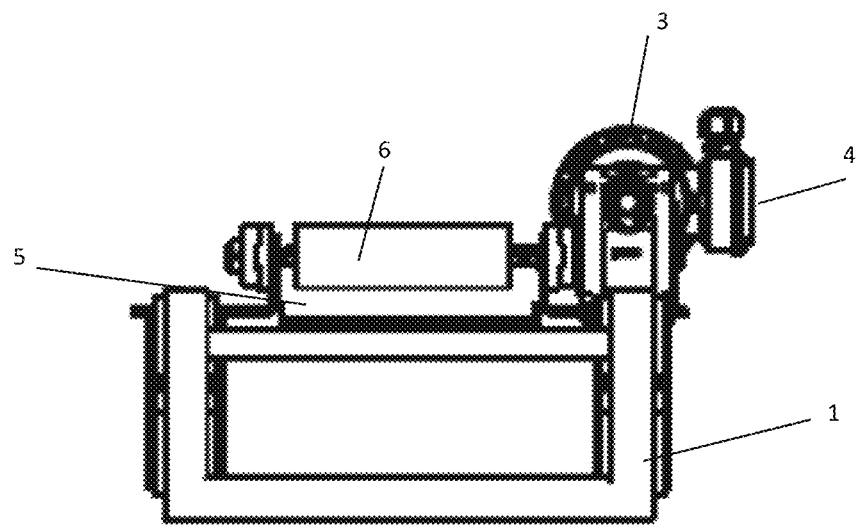
Figure 4:
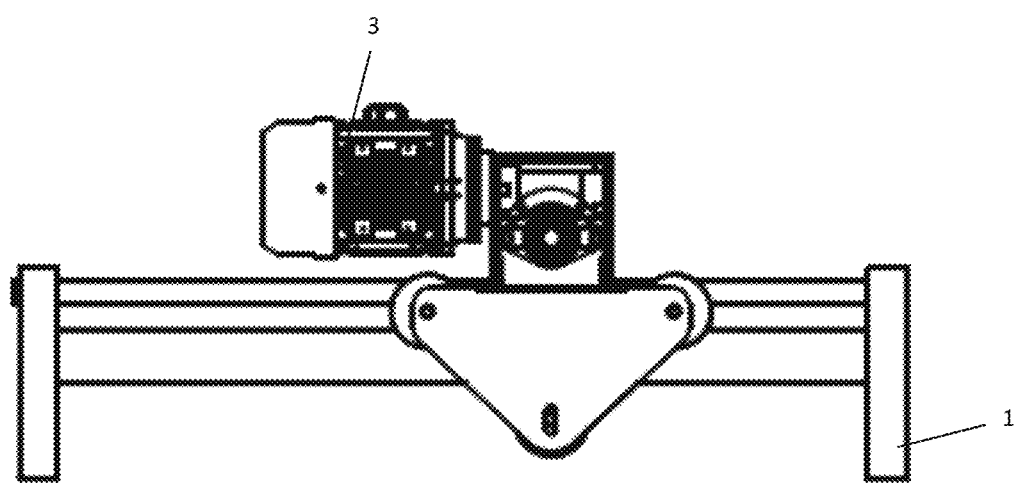

As appears from FIG. 3, the distance (5) between the brush (6) and the conveyor belt (2) is provided with setting options to be able to optimize this taking into account the size of the prawns processed.

Figure 6:
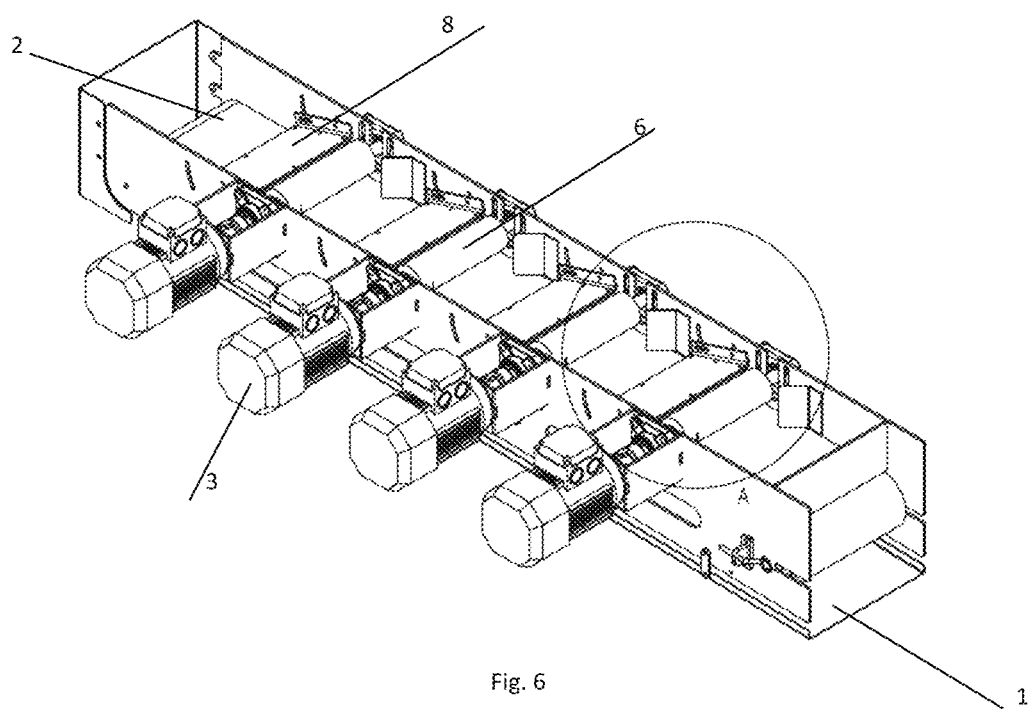
Figure 7:
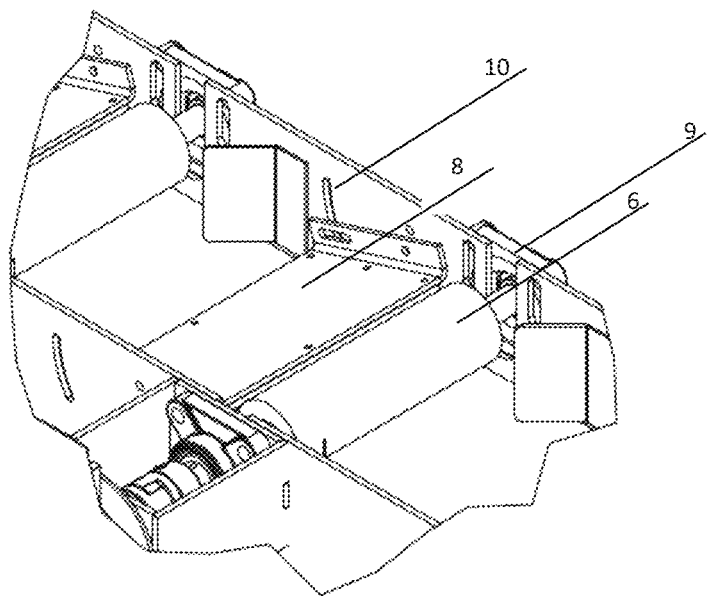
Figure 8:
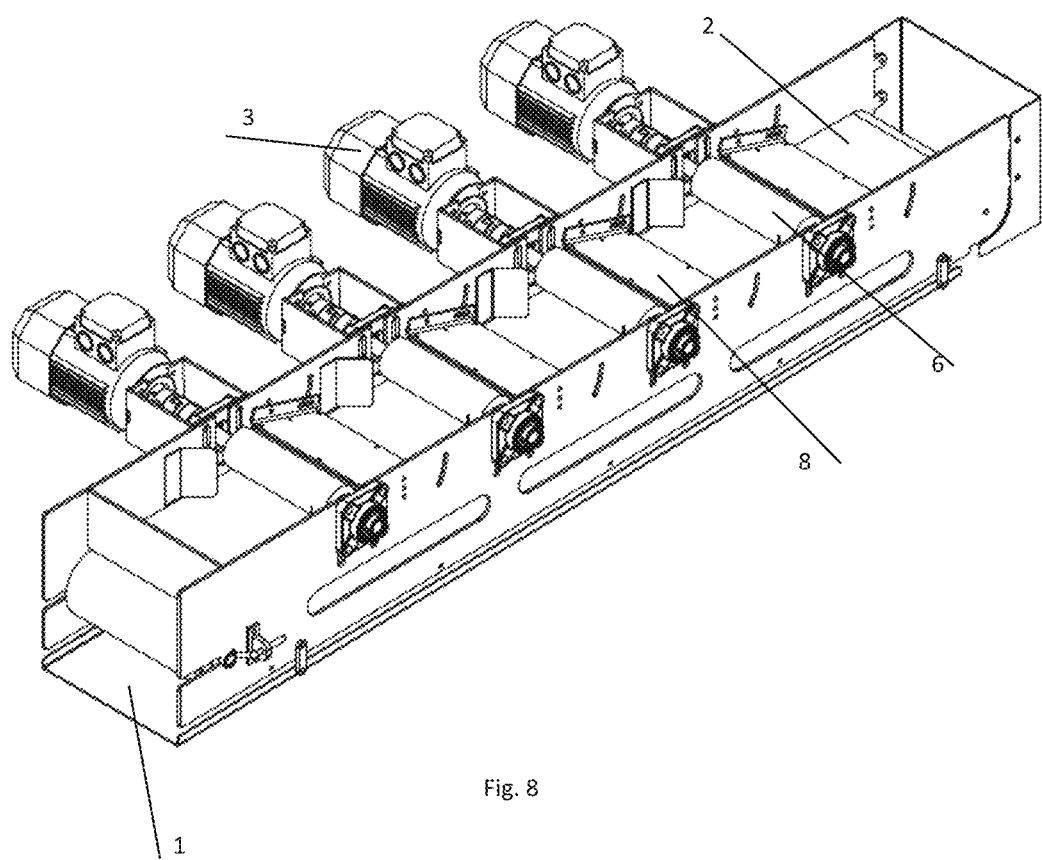
FIG. 8 shows the second prototype from another angle.

FIGS. 6, 7 and 8 show another arrangement of a prototype of the invention, where on a belt conveyor frame (1), a conveyor belt (2) is mounted, above which a number of rotating brushes (6) are shown, which are driven by motors (3). Plates (8) are positioned across the conveyor belt where the shrimps are to be positioned and at a height above the conveyor belt, the plates (8) being positioned following the one or more mounted rotating brushes (6) according to the direction at which the conveyer belt is driven/running. The shrimps, subject to the action of the brush (6) rotation in interaction with the distance between the brush (6) and the "conveyor belt" (2), and the following action of the plates, will have the heads separated from the body while the shell is simultaneously ripped up at least partly, so that the shrimp peeling machine itself can more easily take hold.

As appears from FIG. 7, the distance (9) between the individual brushes (6) and the conveyor belt (2) and the distance (10) between the individual plates (8) and the conveyer belt (2) is provided with setting options to be able to optimize this taking into account the size of the shrimps, krills or prawns processed.

In one or more embodiments, the height above the conveyor belt is adjustable. This means that the distance between the one or more brushes and the conveyor belt can be varied to be able to optimize the pre-peeling machine for the size of the shrimps that are to be treated. In one embodiment, it is the one or more mounted rotating brushes that are changed in settings to vary the height between the conveyer belt and the one or more mounted rotating brushes. In one or more embodiments, it is the conveyer belt that are changed in settings to vary the height between the conveyer belt and the one or more mounted rotating brushes.

In one or more embodiments, the one or more mounted brushes can be mounted in one frame. The frame can be arranged so as to be able to detach or be lifted off from the rest of the machine easy whereby the cleaning of the machine is more easily done.

In one or more embodiments the height from the conveyer belt to the one or more mounted rotating brushes are in the range of 0.1 to 20 cm, such as in the range of 0.2 to 15 cm, such as in the range of 0.5 to 10 cm. such as in the range of 0.5 to 5 cm, such as in the range of 0.5 to 3 cm.

In one or more embodiments, the one or more brush rotates at a number of revolutions that is adjusted to the speed at which the conveyor belt is advancing.

The one or more brushes can be made of various materials as long as the material is useful and approved for food production and easy to clean.

In one or more embodiments, the motor that drives the one or more brush is an electric motor.

In one or more embodiments, the machine further comprises one or more plates positioned across the conveyor belt where the shrimps are to be positioned and at a height above the conveyor belt, the plates being positioned following the one or more mounted rotating brush according to the direction at which the conveyer belt is driven/running.

It can be an advantage to have a plate positioned after a brush since the shrimps can be caught by the plate when the shrimps are exited from the brush with a high speed. Further, in the impact with the plate, the shell of the shrimp also loosens. Hence, the plates are further adding to the pre-treatment of the shrimps and the time spend on the pre-treatment can be reduced.

By the "height" is meant the distance from the surface of the conveyor belt to the point of the one or more plates that is closest to the conveyor belt surface. This distance is participative in ripping of the shell, since the shrimps are caught in the gap between the surface of the conveyor belt and the underneath surface of the one or more plates.

By "across" is meant that the one or more plates span the width of the conveyor belt. It may span the width completely or it may span the width in e.g. at least 50% of the width of the conveyor belt. For a better understanding of "across" in the present invention, please see the figures.

In one or more embodiments, the one or more plates have a friction surface on the side facing the conveyor belt. It can be an advantage that the surface facing the conveyor belt has a non-smooth surface, since when the shrimps are exited from the brush with a high speed, the roughness of the surface of the plate helps to catch the shrimps and to loosen the shell of the shrimps.

In one or more embodiments, the friction surface is part of the plate and made in the same material as the plate. In one or more embodiments, the friction surface is attached to the plate and made in another material than the plate.

In one or more embodiments, the one or more plates are not completely parallel with the surface of the conveyer belt. The one or more plates may be mounted haven a small deviation from parallel, such as in the range of from 1 to 45 degrees, e.g. such as from 1 to 30 degrees. By this setup, the shrimps being exited from the rotating brush with a high speed will easy be catched in the shaft between the plate and the surface of the conveyer belt.

In one or more embodiments, the one or more plates has the same deviation from parallel, but they could also has different deviations from parallel.

In one or more embodiments, the height of the plates above the conveyor belt is adjustable (10).

In one or more embodiments the height from the conveyer belt to the one or more plates are in the range of 0.1 to 20 cm, such as in the range of 0.2 to 15 cm, such as in the range of 0.5 to 10 cm. such as in the range of 0.5 to 5 cm, such as in the range of 0.5 to 3 cm.

The one or more plates and/or friction surfaces can be made of various materials as long as the material is useful and approved for food production and easy to clean.

In one or more embodiments, the plates can be made of a material selected from the following metal such as stainless steel, plastic or rubber.

In one or more embodiments, the friction surface can be made of a material selected from the following metal such as stainless steel, plastic or rubber such as nitrile rubber.

In one or more embodiments, the one or more plates has the same friction surface, but the plates could also have different friction surfaces by varying the material.

The distance from a brush to a plate along the conveyer belt can vary, also depending on the rotational speed of the brush.

The invention is justified, at least since it has proven that it is associated with certain difficulties to machine-peel shrimps that have been boiled and frozen on the trawler directly after the catch, as this pre-treatment at sea causes the shrimp shells to adhere more closely to the shrimps, for which reason it has been necessary to peel these shrimps manually once they come ashore and therefore they have in certain cases been transported around the world to be peeled manually in the cheapest location.

It has then turned out that if the heads of these shrimps are separated from the bodies early in the peeling process, it will be possible also to machine-peel these shrimps with a satisfactory result.

Therefore, the machine according to this invention is in one embodiment to be inserted as a pre-treatment process for these selected shrimps in the process line before they are forwarded to the shrimp peeling machines in the shelling process.

At also mentioned, the machine according to this invention can be used on the trawler at sea as a pre-treatment even before the shrimps are boiled. The shrimps can then be boiled afterwards—still on sea—but it will save a certain amount of energy since only a part of the shrimp are being boiled compared to if the whole shrimp are being boiled.

The invention described here is shown (and described) as the prototype(s) that they are and therefore many other configurations and executions of the machine are conceivable. For instance, a larger amount of successive brushes (6) is conceivable to ensure an optimum result.

The present invention also relates to a process for pre-treatment of selected shrimp types, the process comprising the following steps:
at one end of a conveyer belt, the shrimps to be pre-treated are loaded onto the conveyer belt;
one or more mounted rotating brush positioned across the conveyer belt catch the shrimps and rip of the head of the shrimps and loosens the shell at least partly.

In one or more embodiments of the process for pre-treatment of selected shrimp types, the process further comprises a step where one or more mounted plates positioned across the conveyor belt catch the shrimps and loosens the shell at least partly.

When describing the embodiments, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisage all possible combinations and permutations of the described embodiments.

The invention claimed is:

1. A machine for pre-treatment of selected shrimp types comprising:
   a conveyor belt where the shrimps are to be positioned,
   one or more mounted rotating brush that is driven by a motor, and
   one or more plates, the plates being positioned following the one or more mounted rotating brush according to the direction at which the conveyer belt is driven,
   wherein the one or more mounted rotating brush and the one or more plates are positioned at a height above the conveyor belt and across the conveyor belt.

2. A machine for pre-treatment of selected shrimp types according to claim 1, wherein the height above the conveyor belt is adjustable.

3. A machine for pre-treatment of selected shrimp types according to claim 1, where the height from the conveyer belt to the one or more mounted rotating brush is in the range of 0.1 to 20 centimeters (cm).

4. A machine for pre-treatment of selected shrimp types according to claim 1, wherein the one or more brush rotates at a number of revolutions that is adjusted to the speed at which the conveyer belt is advanced.

5. A machine for pre-treatment of selected shrimp types according to claim 1, wherein the motor that drives the one or more brush is an electric motor.

6. A machine for pre-treatment of selected shrimp types according to claim 1, where the one or more plates have a friction surface on the side facing the conveyer belt.

7. A machine for pre-treatment of selected shrimp types according to claim 1, where the height above the conveyor belt is adjustable.

8. A machine for pre-treatment of selected shrimp types according to claim 1, where the height from the conveyer belt to the one or more plates are in the range of 0.1 to 20 cm.

9. A machine for pre-treatment of selected shrimp types according to claim 6, where the friction surface is made of a material comprising metal, plastic or rubber.

10. A process for pre-treatment of selected shrimp types, the process comprising:
    loading, at one end of a conveyer belt, the shrimps to be pre-treated;
    using one or more mounted rotating brush positioned across the conveyer belt to catch the shrimps and rip off the heads of the shrimps and loosen the shells at least partly; and
    using one or more mounted plates positioned across the conveyor belt to catch the shrimps and loosen the shells at least partly.

11. A machine for pre-treatment of selected shrimp types according to claim 9, wherein the friction surface comprises stainless steel.

12. A machine for pre-treatment of selected shrimp types according to claim 9, wherein the friction surface comprises nitrile rubber.

\* \* \* \* \*